Nov. 27, 1951     P. H. STANLEY     2,576,487
DEICING SYSTEM FOR AIRCRAFT SUSTAINING ROTOR BLADES
Filed June 26, 1947     2 SHEETS—SHEET 1
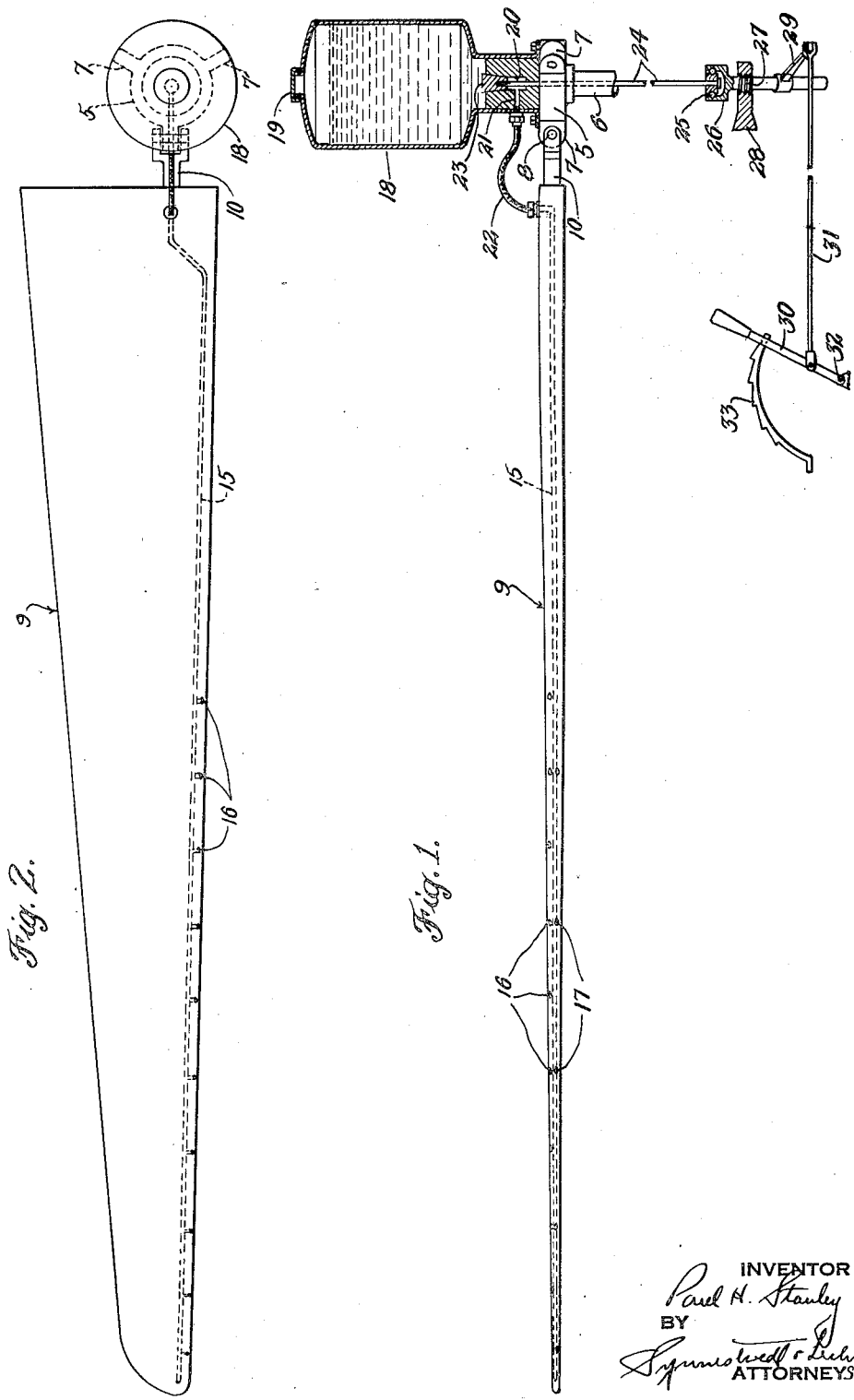
INVENTOR
Paul H. Stanley
BY
ATTORNEYS

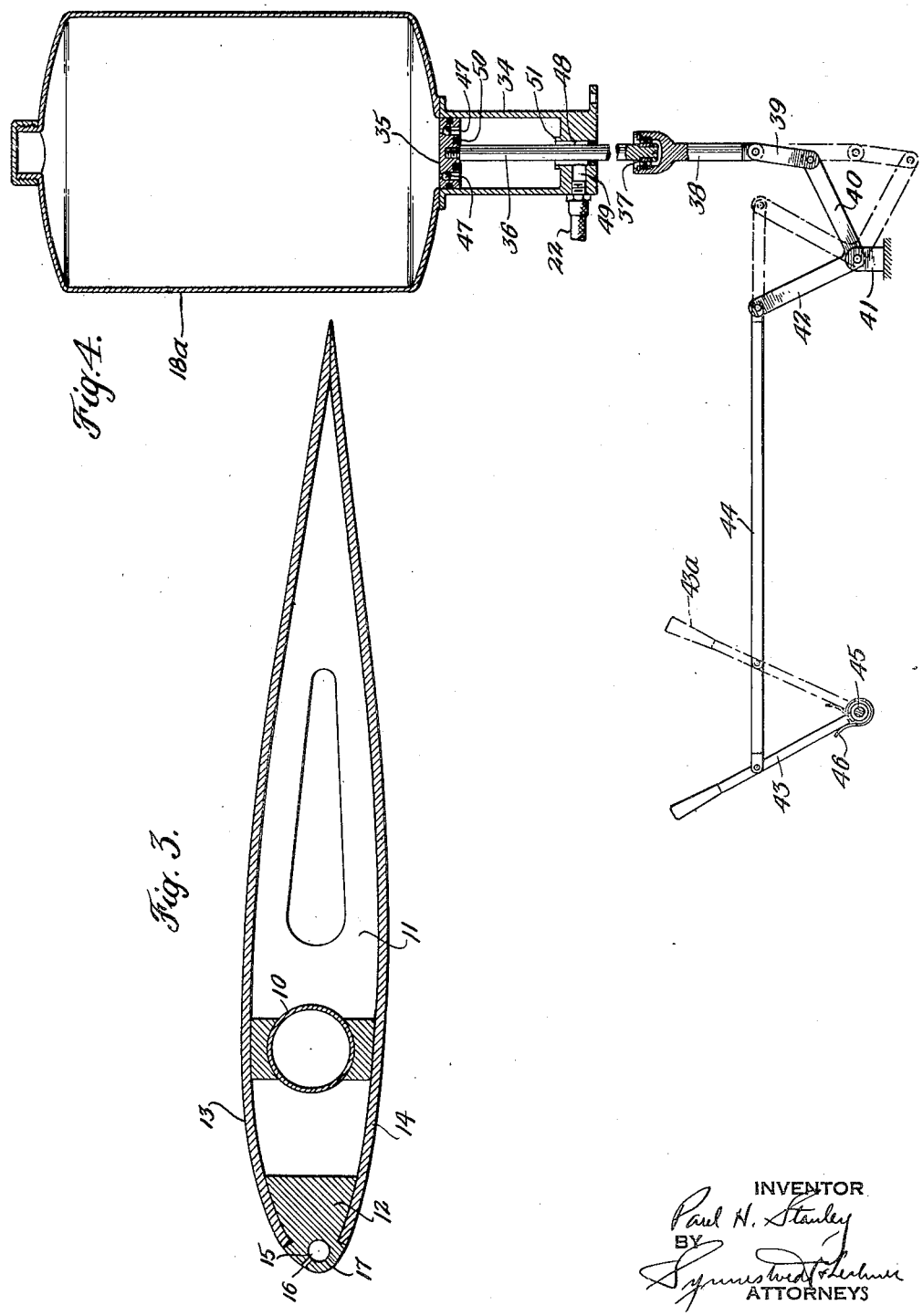

Patented Nov. 27, 1951

2,576,487

UNITED STATES PATENT OFFICE 2,576,487

DEICING SYSTEM FOR AIRCRAFT
SUSTAINING ROTOR BLADES

Paul H. Stanley, Huntingdon Valley, Pa., assignor to Autogiro Company of America, Philadelphia, Pa., a corporation of Delaware Application June 26, 1947, Serial No. 757,147

3 Claims. (Cl. 244—134)

This invention relates to a system and equipment for preventing the formation and adherence of ice on the surfaces of aircraft sustaining rotor blades.

Among the important objects of the invention are the provision of a deicing system which does not require the addition of any substantial weight to the aircraft nor the consumption of any power.

The invention, moreover, has in view the provision of a deicing system of extreme simplicity and reliability.

As another object, the invention makes provision for manual control of the system, so that it is placed in operation only at times when atmospheric conditions tend to develop ice on the rotor blades.

How the foregoing objects and advantages are attained is explained more fully herebelow with reference to the accompanying drawings, in which—

Figure 1 is an elevational view of a part of the hub of a sustaining rotor, with a sustaining rotor blade pivotally connected with the hub, the blade being constructed in accordance with the present invention and the view also showing, in vertical section, certain parts of the deicing equipment contemplated for use according to the invention;

Figure 2 is a top plan view of the features shown in Figure 1;

Figure 3 is a transverse vertical sectional view through the rotor blade of Figures 1 and 2 on an enlarged scale; and Figure 4 is a view similar to certain parts of Figure 1 but illustrating a modification.

The hub of an aircraft sustaining rotor, for instance of a helicopter is indicated at 5 in Figures 1 and 2, this hub being provided with a spindle 6 adapted to be appropriately journaled in the body of the aircraft and also adapted to be driven so as to drive the rotor blades during flight of the aircraft. The hub is provided with a plurality of apertured ears 7 each adapted to cooperate with a flapping pivot 8 for pivotal attachment of a rotor blade such as generally indicated at 9. It will be understood that the invention is applicable to rotors having any desired number of blades, although in the illustration of the drawing the hub is arranged to mount three such blades.

As best seen in Figure 3, the blade is built up on a main longitudinal spar 10 to which transverse ribs 11 are connected. A nose piece or stringer 12 is also employed and the upper and lower blade surfacing elements 13 and 14 are desirably secured to the nose strip 12 as well as to the ribs 11.

A duct 15 extends longitudinally of the blade preferably within the nose strip 12, this duct 15 serving to carry deicing fluid of a type mentioned more fully hereinafter. A plurality of ports 16 and 17 extend from the duct 15 to the surface of the blade adjacent the leading edge, ports 16 being extended somewhat upwardly and ports 17 somewhat downwardly so as to provide for distribution of deicing fluid, respectively, to the upper and lower surfaces of the blade.

Surmounting the hub 5 and secured thereto is a tank 18 constituting a source of supply of deicing fluid, this tank having a removable cap 19 at the top providing for refilling, and having a discharge passage 20 at its lower end with which branch passages 21 communicate, one such branch being provided for each blade of the rotor. Each branch 21 is connected to duct 15 of the corresponding blade by means of a flexible tube 22 which accommodates the pivotal movement of the blade on its flapping pivot 8.

Entrance of fluid from the tank 18 to the passage 20 is controlled by a plug valve 23 which may be lifted from its seat by means of a vertical rod 24 extending downwardly through the hub 5 and its hollow mounting shaft 6. A rotative connection 25 is provided between the shaft 24 and the vertically movable actuating member 26, which latter is screw threaded as at 27 in a fixed support 28. The actuating member 26 is adapted to be oscillated by means of an arm 29 which is coupled to a hand lever 30 by means of link 31, the hand lever being located in the occupant's compartment of the aircraft. Lever 30 is pivoted at 32 to a fixed part and has a notched quadrant 33 associated therewith so as to retain the lever in any desired position of adjustment. The valve 23 may thus be manually opened and closed and may also be set at any desired degree of opening.

The operation of the foregoing structural features is discussed herebelow following the description of the modified supply system illustrated in Figure 4.

As seen in Figure 4 the modified arrangement employs a reservoir or supply tank 18a having at its lower end a cylinder 34 with a piston 35 vertically reciprocable therein. This assembly is adapted to be mounted upon a sustaining rotor hub, as in the case of the arrangement shown in Figures 1 and 2. The piston stem 36 extends downwardly through the hub and its hollow mounting shaft, as in the first form, and has a rotative connection 37 with the actuating member 38 which is adapted to be vertically moved by a link 39 connected with one arm 40 of a bellcrank pivotally mounted on a fixed part at 41. The other arm 42 of the bellcrank is connected with the hand lever 43 by a rod 44. The hand lever 43 is pivotally mounted at 45 and is provided with a return spring 46 normally urging the lever to the dot-and-dash position 43a in which the piston 35 is located at the lower end of cylinder 34.

Attention is now called to the fact that the piston is provided with one or more ball-check or other one-way valves 47 which permit fluid to flow from the supply tank 18a downwardly into the cylinder 34 when the piston is in its upper position. At its lower end cylinder 34 communicates with a supply passage 48 having a plurality of branches such as indicated at 49, one for each blade of the rotor. As in the arrangement described above, each branch 49 is connected with a duct in the corresponding blade by means of a flexible pipe 22.

When the piston is moved downwardly by the return spring 46 a packing 50 seats against the annular lip 51 surrounding the supply passage 48 and thereby closes off the supply passage.

In considering the operation of the two systems described above, attention is first called to the fact that they have many features in common and, in general, both function on the principle of feeding a deicing fluid from a source of supply to the surface of the blade or blades. Although quite a wide variety of fluids may be employed for deicing purposes, according to the system of the present invention it is preferred to employ a liquid of such physical characteristics as to prevent adherence of an ice film to the surface of the blade. For this purpose, the liquid is preferably at least somewhat oily and has a relatively low freezing point. Typical and preferred liquids for the purpose are glycols, such as ethylene glycol, diethylene glycol, etc.

With either of the two equipments described above, the deicing fluid is delivered from the source of supply to the duct in the blade and the fluid is forced radially outwardly by the action of centrifugal force, for discharge through the several ports 16 and 17. Upon discharge through the ports, the liquid spreads over the surfaces of the blade, in part as a result of the oily or oleaginous character of the liquid and in part because of the air flow over the surfaces of the blade. In this way a film of the deicing liquid is spread over at least a major portion of the area of the blade and even under relatively severe icing conditions, no appreciable layer of ice will build up upon the blade or adhere thereto. The use of glycols, such as those mentioned above, is also of advantage because of the fact that the glycols have unusually low vapor pressures, as a result of which they evaporate very slowly. They are, moreover, readily miscible with water. This characteristic coupled with their low freezing point results in formation of an aqueous glycol solution also of low freezing point, when mosture is deposited on the blades under icing conditions.

It may further be mentioned that even a relatively small quantity and a relatively thin film of the deicing fluid will be effective for the intended purpose, because of the fact that the action of centrifugal force and blade flexure also tend to dislodge any ice which may develop on the surfaces of the blade.

Since the icing of the upper surface of the blade is more critical and serious than icing at the lower surface, the invention contemplates distribution of a greater quantity of deicing fluid to the upper surface than to the lower surface. This is preferably accomplished by employing a greater number of ports 16 directed upwardly from the duct 15, as compared with the number of ports 17 directed downwardly from the duct. Thus it is contemplated that the total cross-sectional area of the ports discharging above the leading edge of the blade should be greater than that of the ports discharging below the leading edge of the blade.

With further reference to the ports 16 and 17, it is preferred that their cross-sectional area be graduated lengthwise of the blade, with those toward the tip of the blade smaller than those relatively inboard. Since the deicing liquid is being forced radially outwardly through the duct 15 under the action of centrifugal force (which progressively increases toward the blade tip), the graduation in cross-sectional area of the ports serves to regulate the quantity of deicing liquid discharged at different points lengthwise of the blade. By proper proportioning of the cross-sectional area of the several ports a more uniform film may be built up on the blade throughout the region in which the ports are located.

It is further mentioned that since the most effective portion of the blade is the outboard or tip region thereof, the invention contemplates concentration of the discharge ports in said outboard region. Indeed for use under normal icing conditions it is unnecessary to provide such ports in the inner or root end portion of the blade.

Another feature of importance in both of the arrangements described above is that the reservoir or source of supply of deicing fluid is located above the hub so that gravity tends to cause the liquid to flow downwardly therefrom to the blade ducts. In the arrangement shown in Figures 1 and 2, when the plug valve 23 is lifted, gravity alone serves to deliver the liquid through the passages 20 and 21 to the flexible tubes 22 and from there to the inner ends of the blade ducts 15. Centrifugal force then serves to carry the liquid through the ducts for ultimate discharge through the ports. It is further mentioned with reference to the arrangement of Figures 1 and 2 that the manual control lever 30 provides for opening and closing of the valve 23 and for a plurality of positions of adjustment of said valve, whereby the desired quantity of deicing liquid may be continuously fed to the surfaces of the blades. The rotative connection 25 between the rod 24 and the actuating element 26 accommodates the rotational movement of the parts which are carried by the rotor hub.

In connection with the operation of the supply system shown in Figure 4, it is noted that the piston 35 provides for the delivery of measured quantities of deicing fluid to the blade ducts. As above mentioned the spring 46 normally retains the piston in its lower position in which the packing 50 abuts the lip 51 thereby closing off the reservoir from the ducts. Upon manual actuation of the lever 43 from the dotted line position 43a to the full line position, a charge of deicing liquid is delivered through the valves 47 into the cylinder 34, and the spring 46 then acts to deliver this charge to the ducts in the blades. Thus the only attention which the pilot need give to the system of Figure 4 is to periodically actuate the lever 43 in one direction, this being done with greater or lesser frequency depending upon the icing conditions encountered.

According to the invention, a simple, effective and reliable system is provided for preventing the formation of ice on aircraft sustaining rotor blades, the system being of such character as not to require or rely upon any power source. The equipment utilized, moreover, is of relatively light weight.

The fluid connections from the source of supply above the hub to the blades are so arranged as to accommodate pivotal blade movements and in addition the control system is arranged to accommodate rotation of the source of supply with the rotor.

As compared with employment of inflatable deicing boots and the like, the system of the present invention is highly advantageous since it does not require distortion of the desired airfoil section of the sustaining rotor blades.

I claim:

1. In an aircraft sustaining rotor having a hub and a blade connected therewith, a duct carried by the blade for delivery of a deicing fluid to the surface of the blade, a source of supply of deicing fluid located above the rotor hub, a regulable device for delivering fluid from said source to said duct, and manually operable control means for said device including a control connection extended through the rotor hub.

2. In an aircraft sustaining rotor having a hub and a blade pivotally connected with the hub for swinging relative to a true radial position, a duct carried by the blade for delivery of a deicing fluid to the surface thereof, a source of supply of a deicing fluid, a deicing fluid supply passage mounted on the hub and adapted to receive fluid from said source, a fluid connection between said supply passage and said duct accommodating swinging movements of the blade, and control mechanism for regulating the flow of fluid through said passage including valve means for said passage and a control linkage for said valve means incorporating relatively rotatable joint means accommodating rotation of the rotor.

3. In an aircraft sustaining rotor having a hub and a blade connected therewith, a duct carried by the blade for delivery of a deicing fluid to the surface of the blade, a source of supply of deicing fluid mounted for rotation with the rotor, and a connection between said source and said duct including a manually controllable valve.

PAUL H. STANLEY.

REFERENCES CITED

The following references are of record in the file of this patent:

UNITED STATES PATENTS

| Number | Name | Date |
|---|---|---|
| 2,335,018 | Morris et al. | Nov. 23, 1943 |
| 2,339,772 | De Stefano | Jan. 25, 1944 |
| 2,423,700 | Hardy | July 8, 1947 |
| 2,447,095 | Schmidt | Aug. 17, 1948 |
| 2,469,480 | Sikorsky | May 10, 1949 |

FOREIGN PATENTS

| Number | Country | Date |
|---|---|---|
| 557,191 | Great Britain | Nov. 9, 1943 |